United States Patent
Deckers et al.

(10) Patent No.: US 8,120,876 B2
(45) Date of Patent: Feb. 21, 2012

(54) MEDIUM FOR USE IN A TAPE DRIVE APPARATUS HAVING IDENTIFICATION SEGMENT AND A SEGMENT IDENTIFICATION PATTERN

(75) Inventors: Stephen V. Deckers, Eagle, ID (US); Nigel Ronald Evans, Bristol (GB); Robert Morling, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2175 days.

(21) Appl. No.: 10/902,702

(22) Filed: Jul. 30, 2004

(65) Prior Publication Data

US 2006/0023357 A1    Feb. 2, 2006

(51) Int. Cl.
*G11B 5/78* (2006.01)
*G11B 5/627* (2006.01)
*G11B 15/08* (2006.01)

(52) U.S. Cl. ........................ 360/134
(58) Field of Classification Search .......... 360/134
See application file for complete search history.

(56) References Cited

U.S. PATENT DOCUMENTS

| | | | | |
|---|---|---|---|---|
| 4,146,031 A | * | 3/1979 | Fujiyama et al. | 360/134 |
| 4,422,111 A | * | 12/1983 | Moeller et al. | 360/134 |
| 5,566,033 A | * | 10/1996 | Frame et al. | 360/74.6 |
| 5,576,903 A | | 11/1996 | Brown et al. | |
| 6,229,659 B1 | | 5/2001 | Watkins et al. | |
| 6,385,001 B1 | | 5/2002 | Skaar | |

FOREIGN PATENT DOCUMENTS

| | | |
|---|---|---|
| EP | 0 496 461 A1 | 7/1992 |
| GB | 2266402 A | 10/1993 |
| JP | 6036532 A | 2/1994 |
| JP | 10199194 | 7/1998 |
| JP | 2002050094 | 2/2002 |
| WO | WO 00/05718 | 2/2000 |

OTHER PUBLICATIONS 3,81 mm Wide Magnetic Tape Cartridge for Information Interchange—Helical Scan Recording—DDS-4 Format, Standard ECMA—288, Jun. 1999.

* cited by examiner

*Primary Examiner* — Craig A. Renner

(57) ABSTRACT

A tape medium has an identification segment located on a transparent leader segment of the tape medium for optical detection of the segment identification pattern. The segment identification pattern and the medium identification pattern have a predefined spatial relationship, enabling photo-optical detection of the segment identification pattern and reading of the medium identification pattern. The medium identification pattern carries various medium identification information, such as tape manufacturer, tape serial number and a tape medium property.

19 Claims, 4 Drawing Sheets

| # | Code Word | # | Code Word | # | Code Word |
|---|---|---|---|---|---|
| 1 | 0010010 | 28 | 0110101 | 55 | 1011101 |
| 2 | 0010011 | 29 | 0110110 | 56 | 1011110 |
| 3 | 0010100 | 30 | 0110111 | 57 | 1011111 |
| 4 | 0010101 | 31 | 0111001 | 58 | 1100100 |
| 5 | 0010110 | 32 | 0111010 | 59 | 1100101 |
| 6 | 0010111 | 33 | 0111011 | 60 | 1100110 |
| 7 | 0011001 | 34 | 0111100 | 61 | 1100111 |
| 8 | 0011010 | 35 | 0111101 | 62 | 1101001 |
| 9 | 0011011 | 36 | 0111110 | 63 | 1101010 |
| 10 | 0011100 | 37 | 0111111 | 64 | 1101011 |
| 11 | 0011101 | 38 | 1001001 | 65 | 1101100 |
| 12 | 0011110 | 39 | 1001010 | 66 | 1101101 |
| 13 | 0011111 | 40 | 1001011 | 67 | 1101110 |
| 14 | 0100100 | 41 | 1001100 | 68 | 1101111 |
| 15 | 0100101 | 42 | 1001101 | 69 | 1110010 |
| 16 | 0100110 | 43 | 1001110 | 70 | 1110011 |
| 17 | 0100111 | 44 | 1001111 | 71 | 1110100 |
| 18 | 0101001 | 45 | 1010010 | 72 | 1110101 |
| 19 | 0101010 | 46 | 1010011 | 73 | 1110110 |
| 20 | 0101011 | 47 | 1010100 | 74 | 1110111 |
| 21 | 0101100 | 48 | 1010101 | 75 | 1111001 |
| 22 | 0101101 | 49 | 1010110 | 76 | 1111010 |
| 23 | 0101110 | 50 | 1010111 | 77 | 1111011 |
| 24 | 0101111 | 51 | 1011001 | 78 | 1111100 |
| 25 | 0110010 | 52 | 1011010 | 79 | 1111101 |
| 26 | 0110011 | 53 | 1011011 | 80 | 1111110 |
| 27 | 0110100 | 54 | 1011100 | 81 | 1111111 |

Fig. 3

MEDIUM FOR USE IN A TAPE DRIVE APPARATUS HAVING IDENTIFICATION SEGMENT AND A SEGMENT IDENTIFICATION PATTERN

FIELD OF THE INVENTION

The present invention generally relates to the field of magnetic tape media, and more particularly without limitation to the identification of tape media.

BACKGROUND AND PRIOR ART

For decades information has been stored on magnetic tape medium using tape drives. Initially the magnetic tapes were wound about large reels in similar manner as film for early film projectors. In more recent years the magnetic tape has typically been housed in a cartridge or cassette, extending internally in the cartridge from a supply reel to a take-up reel. In these cartridge applications, typically a leader tape attaches to the reel. A splicing tape then connects the leader to the magnetic tape, which in turn wraps around the reel. Cartridges may contain a supply reel only, or a supply reel and take up reel.

In some systems, the magnetic tape has longitudinal tracks recorded thereon (e.g., tracks that extend along the major length dimension of the tape). In other systems, the path of the magnetic tape is such that the tape is at least partially wrapped around a drum in a manner to transduce helical stripes or tracks on the magnetic tape. Some of the cartridges have a lid or the like which is displaced upon insertion of the cartridge into the tape drive, thereby exposing the magnetic tape to operative elements of the tape drive (e.g., tape guides, tape transport mechanisms, and transducing elements). Other cartridges are fabricated with a window or the like into which operative elements of the tape drive extend when the cartridge is loaded into the tape drive.

Some prior art techniques have been developed whereby, upon insertion into a tape drive, the tape/cartridge is identified as being of a certain type.

U.S. Pat. No. 6,385,001 shows a tape medium that has a transparent identification window segment. The identification window segment has a length that is chosen to provide a predetermined medium or cartridge signature when the medium is transported at a selected linear velocity.

For example, techniques are known for automatic identification of a DAT (digital audio tape) and DDS (digital data storage) tape.

DAT and DDS tape cartridges have the same form factor. DDS tape medium differs from DAT audio tape medium primarily in terms of the quality of the magnetic coating on the tape for increased reliability of the data storage on the tape medium. A DAT audio tape cassette physically fits into a DDS drive, and data can be written to and read from it, but it is likely that the user will experience a significant level of unreliability and loss of data.

GB2266402A discloses a tape medium having a transparent splice or splicing tape that has at least one opaque stripe located on it over the leader tape for automatic recognition of DDS tape, thus distinguishing DDS cartridges from identically sized DAT cartridges. The tape drive has circuitry for finding the junction of the data storage portion of the tape medium and the leader tape by monitoring the output signal of an optical sensor. When toggling of the sensor output signal is detected this indicates that the opaque stripe is present and that the cassette is a DDS type. The absence of toggling indicates that the cassette is not a DDS type, in which case a write-protected mechanism of the tape drive is activated to prevent writing of data to the tape medium and thus the possibility of loss of that data.

The standard ECMA-288, June 1999, that is available from http://www.ecma.ch shows a corresponding medium recognition system (MRS) in its chapter 9.16. In accordance with this standard a pattern of alternating clear and opaque stripes shall exist along the entire length of the splicing tape at the physical beginning of the tape, i.e. where the leader tape is joined to the magnetic tape. The light transmittance through the combination of the opaque stripes and the leader tape shall be 5% max. The light transmittance through the combination of the clear stripes and leader tape shall be 60% minimum. Annex B of the standard ECMA-288 shows the general principle of measuring equipment and a measuring method for measuring the light transmittance of the tape.

In addition to the differentiation between DDS tape medium and DAT tape medium the various format generations of DDS tape medium need to be detected automatically. The problem of distinguishing former generations in DDS cartridges is typically handled by detecting a pattern of four holes, called recognition holes, in the cartridge shell. Annex K of the ECMA-288 standard defines recognition hole patterns and the related DDS format generations 1 to 5 as well as the DAT format (IEC1119-1) represented by the respective recognition hole patterns.

A disadvantage of the recognition holes is that they provide limited information carrying capacity so that only the tape medium format can be encoded, and also that the mechanical sensing of the recognition hole patterns is relatively unreliable and can be subject to mechanical failure.

SUMMARY OF THE INVENTION

The present invention provides a medium for use in a tape drive apparatus. The medium has a magnetic segment having magnetically stored information and an identification segment. The identification segment carries a medium identification pattern and a segment identification pattern for detection of the identification segment.

The medium identification pattern can be used for encoding various medium identification information, such as the format generation of the tape medium and/or the tape cartridge, the manufacturer, a tape medium serial number, a globally unique identifier (GUID) and/or a code word. For example the medium identification pattern can carry a code word that is used by the tape drive apparatus to enable or disable a certain functionality, e.g. a manufacturer or format specific functionality.

In accordance with an embodiment of the invention the identification segment is located on an end segment of the tape medium. The end segment can be a trailer or a leader segment of the tape medium. The medium identification pattern can be on both the trailer and the leader segment but it is preferred that the identification segment is at least on the leader segment. This facilitates detection and reading of the identification segment when the tape medium is loaded into the tape drive apparatus.

In accordance with an embodiment of the invention the end segment on which the identification segment is located is transparent. The medium identification pattern and the segment identification pattern have at least one opaque portion. Preferably the opaque portions of the medium identification pattern and segment identification pattern have the form of stripes.

In accordance with a further embodiment of the invention the medium identification information indicates a property of the tape medium, such as tape thickness, tape coating formulation and/or whether the tape medium is pre-recorded or not.

In another aspect, the present invention relates to a tape drive apparatus. The tape drive apparatus has a data transfer apparatus for transferring data between a loaded tape medium and the tape drive apparatus. Further, the tape drive apparatus has a reader for providing a signal being representative of the identification segment of the tape medium. Preferably, the reader is an optical reader, such as a light source in combination with a photo diode. The signal derived by the reader enables the segment identification pattern to be detected. In response to detection of the segment identification pattern, the medium identification pattern is decoded in order to obtain the medium identification information.

In accordance with a further embodiment of the invention the tape drive apparatus has a non-volatile storage for storing a reference pattern that is used for the detection of the predefined segment identification pattern. The output of the reader is compared with the reference pattern in order to detect a matching segment identification pattern on the tape medium.

In accordance with a still further embodiment of the invention the tape drive apparatus has storage for storing the medium identification information obtained from the medium identification pattern. Preferably the medium identification information obtained from various tape media is stored in a log for later analysis.

After a certain maintenance time interval the log can be read out and entered into an analytical tool and for the purpose of tape medium quality monitoring an/or quality assurance.

In accordance with a further embodiment of the invention the tape drive apparatus has a controller for enabling or disabling a functionality of the tape drive apparatus in response to a predefined code word obtained from the medium identification pattern. For example the code word can indicate that the tape medium is of a superior quality such that a corresponding mode of operation of the tape drive apparatus is selected.

In still another aspect the invention relates to a tape medium that has a magnetic portion having magnetically stored information and an optically readable pattern. The pattern carries at least two bits of information. The optically readable pattern can be used to encode various kinds of information relating to the tape medium and/or to the tape cartridge that contains the tape medium. For example, the pattern can identify the manufacturer of the tape medium and/or the tape cartridge, the tape format generation, a unique identifier and/or a physical or functional property of the tape medium and/or the tape cartridge.

In accordance with an embodiment of the invention, the tape medium has transparent leader and trailer portions on which the optically readable pattern can be positioned. For example, the pattern is located on the leader portion, the trailer portion or both on the leader and trailer portions. It is also possible to put different patterns carrying different kinds of information on the leader and trailer portions and/or to repeat the same pattern once or several times in order to ensure that the respective information can be read even if one of the patterns is corrupted or unreadable.

In still another aspect the invention relates to a tape format that specifies a plurality of optically readable patterns. Each readable pattern carries at least two bits of information. In addition, the tape format can specify allowable positions for one or more of the optically readable patterns on the tape medium.

BRIEF DESCRIPTION OF THE DRAWINGS

In the following preferred embodiments of the invention will be described, by way of example only, and with reference to the drawings in which:

FIG. 3 is an exemplary coding table for a code word carried by the tape medium of FIG. 2.

DETAILED DESCRIPTION OF THE DRAWING

Figure 1:
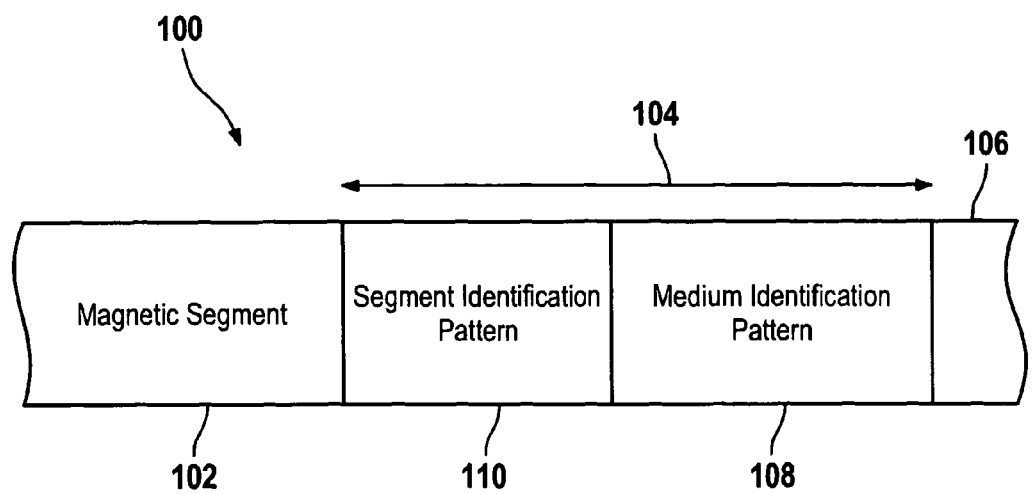
FIG. 1 is a fragmentary view of a first embodiment of a tape medium.

FIG. 1 is a schematic view of a portion of the tape medium 100. Tape medium 100 has a magnetic segment 102 having a magnetic tape coating that magnetically stores information. The tape medium 100 has an identification segment that has a length 104. In the preferred embodiment considered here the identification segment is located on an optically transparent leader segment 106 of the tape medium 100.

The identification segment has a medium identification pattern 108 and a segment identification pattern 110.

The medium identification pattern is optically detectable on the transparent leader segment. For example, the medium identification pattern 108 consists of a pattern of opaque portions that carry medium identification information; e.g. the medium identification information indicates the format generation of tape medium 100, the manufacturer, serial number and/or a globally unique identifier of tape medium 100 and/or another property of tape medium 100, such as its tape thickness, magnetic tape coating formulation and/or whether the tape medium 100 is pre-recorded or not As an alternative or in addition the information carried by the medium identification pattern relates to the tape cartridge, such as the tape cartridge format generation and/or to properties of the cartridge assembly including the tape medium plus the reel and shell used to house the tape medium.

As an alternative or in addition, one or more code words can be encoded in the medium identification pattern 108 for various purposes.

Identification pattern 110 can also consist of a pattern of opaque portions that are optically detectable on the transparent leader segment 106. The identification pattern 110 is located between the magnetic segment 102 and the medium identification pattern 108. The segment identification pattern 110 has a predetermined spatial relationship to the medium identification pattern 108 such that detection of the identification pattern 110 facilitates reading the medium identification pattern 108. For example, the segment identification pattern 110 carries a synchronization word that indicates that the medium identification pattern 108 follows.

Figure 2:
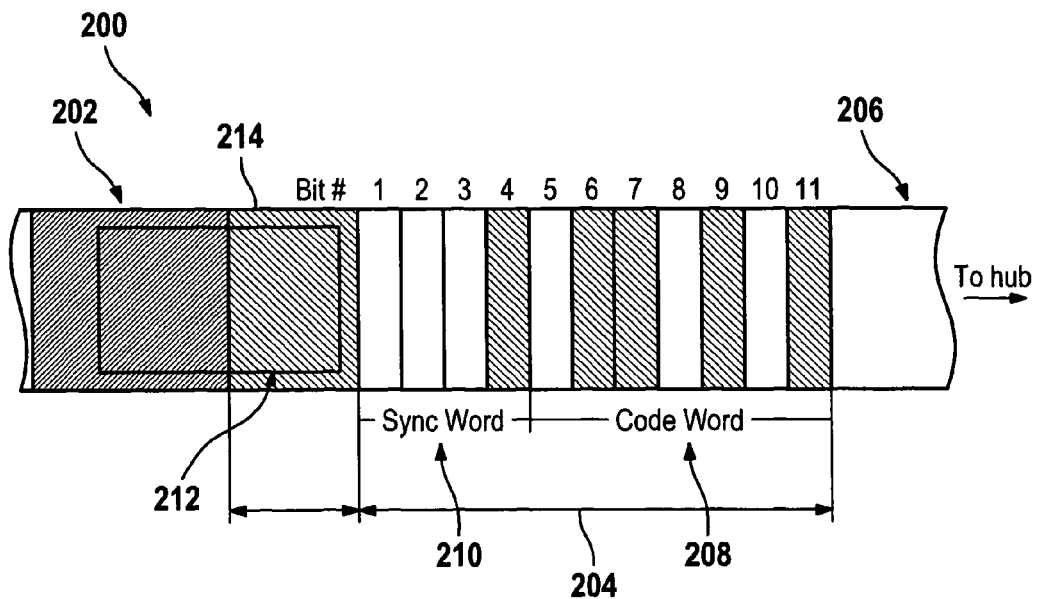
FIG. 2 is a fragmentary view of a more detailed second embodiment of the tape medium.

FIG. 2 is a more detailed drawing of the tape medium of FIG. 1. Elements of FIG. 2 that correspond to elements of FIG. 1 are designated by like reference numerals. Tape medium 200 has a splicing tape 212 that joins the magnetic segment 202 and the leader segment 206. The leader segment 206 has an end portion 214 and the splicing tape 212 extends into end portion 214. Preferably the end portion 214 of the leader segment 206 is opaque. This has the advantage that splicing tapes of various transparencies can be used. In particular, the opaque leader segment 206 resolves the quality issue of having to control the transparency of the splicing tape 212 within a defined range, as is the case in the prior art.

In the preferred embodiment considered here the identification segment 204 carries 11 bits on its bit positions 1 to 11. As shown in FIG. 2 bit positions 1 to 4 form a synchronization word of the segment identification pattern 210 and bit positions 5 to 11 form a code word carried by the medium identification pattern 208. A bit value of logic '0' is represented by a clear stripe on the respective bit position and a bit value of logic '1' is represented by an opaque stripe on the respective bit position. In the example shown in FIG. 2 the synchronization word is '0001' that contains a unique key '000' that is bracketed by opaque portions on either end of the unique key. The code word is '0110101'.

The unique key within the synchronization word is predefined and does not occur in the medium identification pattern 208. Detection of the synchronization word on the leader segment 206 indicates the position of the following medium identification pattern 208. The synchronization word can also be used to detect the physical beginning of the tape (PBOT) when the synchronization word on the leader segment 206 also has a predetermined spatial relationship to the beginning of the magnetic segment 202.

When the tape medium 200 has a transparent trailer segment corresponding to leader segment 206, the trailer segment may be completely clear or it may carry an identical identification segment as that carried by the leader segment 206 but in reverse order, i.e. the synchronization word to the right of the code word. Reverse orientation of the identification segment with respect to the direction of travel of the tape medium 200 facilitates usage of the synchronization word as a PBOT and PEOT (Physical End Of Tape) flag respectively. The trailer segment of the tape medium 200 can contain the same pattern or a similar pattern with a different code indicating different information.

FIG. 3 is a code table containing 81 different code words for the medium identification pattern 208. While FIG. 2 includes code word '0110101', i.e. code word number 28 in the table of FIG. 3, another tape medium 200 of the type shown in FIG. 2 can have any one of the other code words in the table of FIG. 3. For example, each code word can be assigned to a manufacturer or can be indicative of another property of the tape medium 200 or cartridge housing within which the tape medium is contained. Longer code words are possible if the thickness of the clear and opaque stripes constituting the identification segment is reduced and/or if the length of the leader or trailer segment of the tape medium is increased.

Figure 4:
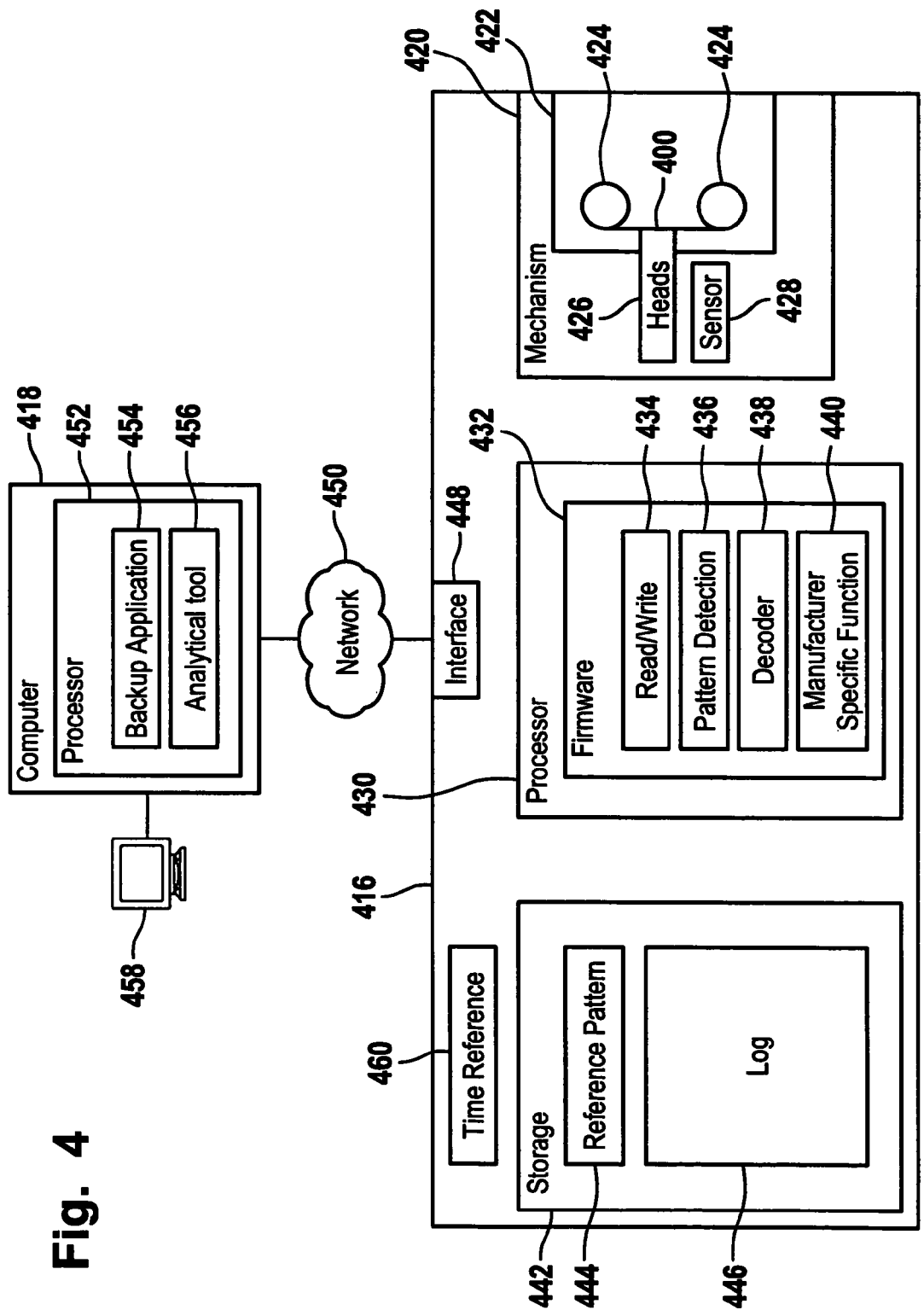
FIG. 4 is a block diagram of a tape drive apparatus that is coupled to a computer, FIG. 5 schematically shows a log of the tape drive of FIG. 4.

FIG. 4 is a block diagram of a tape drive apparatus 416 that is coupled to computer 418. Tape drive apparatus 416 has tape drive mechanism 420, which loads and ejects tape cartridge 422 and winds the tape medium 400 (cf. tape medium 100 of FIG. 1 and tape medium 200 of FIG. 2) forwards or backwards as required for reading and writing data by rotating the reels 424. In a magnetic drive for tapes having diagonal tracks (e.g., DDS tapes) the read/write heads 426 are mounted on a helical scanning drum which rotates to sweep the heads 426 past the tape medium 400 in a motion oblique to the direction of travel of the tape medium 400.

Further, tape drive mechanism 420 has an optical sensor 428 that delivers a signal that indicates a photo-optical transmissiveness of the tape medium 400. For example, optical sensor 428 has a light emitting diode and a photo detector for measuring a signal that corresponds to the optical energy that is transmitted through the tape medium 400. The design of the optical sensor 428 can be in compliance with the ECMA-288 specification annex B.

Tape drive apparatus 416 has processor 430 for execution of firmware 432. Firmware 432 comprises instructions 434 for reading/writing data both from and to the magnetically coded data storage portion of the tape medium 400 (cf. magnetic segment 102 and 202 in the embodiments of FIGS. 1 and 2, respectively).

The instructions 436 enable detection of the segment identification pattern (cf. FIGS. 1 and 2) in the signal delivered by the sensor 428. Instructions 438 implement a decoder for decoding a code word obtained from the medium identification pattern (cf. FIGS. 1 and 2) that follows the segment identification pattern. Instructions 440 implement a manufacturer or format specific software function that is enabled when a predetermined code word is received from the sensor 428.

Tape drive apparatus 416 has non-volatile memory 442 for storing a reference pattern 444 that is identical to or that matches the predefined segment identification pattern of the identification segment of tape medium 400. Further, memory 442 stores log 446. A log entry is created in log 446 each time a tape cartridge is loaded into tape drive apparatus 416.

Tape drive apparatus 416 has interface 448 for coupling the tape drive apparatus 416 to a computer 418 via a network 450. Computer 418 has processor 452 for execution of a backup application program 454 and analytical tool 456. A monitor 458 is coupled to computer 418.

For storage of backup data or for recovery of previously stored backup data the tape cartridge 422 is loaded into tape drive apparatus 416. In response the drive spindle (not shown in FIG. 4) of the tape drive apparatus 416 is activated and the tape medium 400 is transported past the heads 426 and the sensor 428.

The signal delivered by the sensor 428 is compared with the reference pattern 444 stored in memory 442 by execution of the instructions 436. When a match is detected the segment identification pattern has been found. Because the medium identification pattern has a predefined spatial relationship to the segment identification pattern, the medium identification pattern can also be identified in the signal derived by the sensor 428 and decoded by instructions 438.

The decoded medium information pattern is entered into log 448. Further, a code word contained in the decoded information pattern is compared with a predefined code word. If the code words match, the instructions 440 are executed.

Preferably, the tape drive apparatus 416 has a time reference 460 that can be implemented as a so called real-time clock (RTC). A log entry that is entered into the log 446 is time stamped by the actual time value provided by the time reference 460.

For the purpose of quality monitoring and/or quality assurance the log 446 can be read out of storage 442 in response to a corresponding request received from analytical tool 456. By use of analytical tool 456 the content of the log 446 can be visualised on monitor 458 for a user's review of past usages of various tape cartridges.

Figures 5, 6:
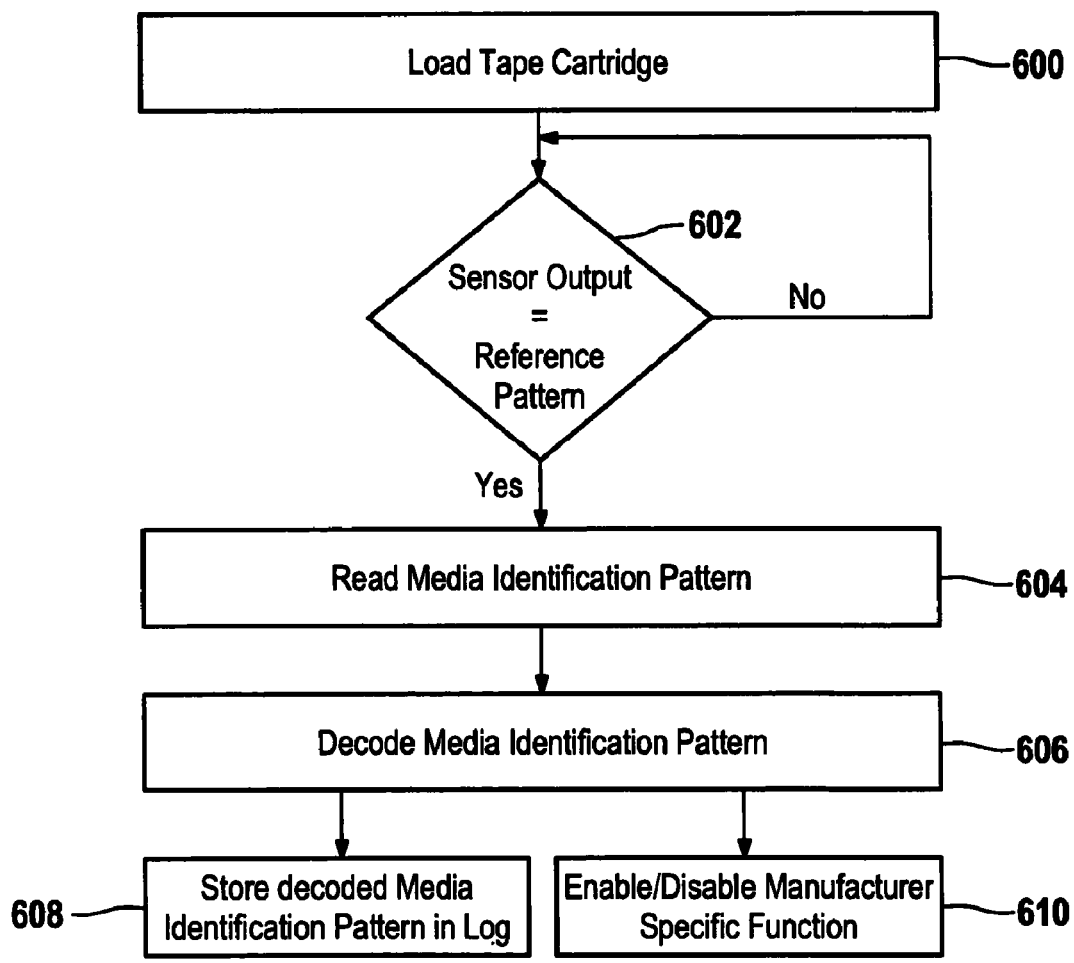
FIG. 6 is a flow chart of steps for reading the medium identification information from the tape medium.

FIG. 5 is a diagram of the structure of the log 446 of FIG. 4. Each row of the tabular log corresponds to one log entry. Each log entry is time stamped and contains the tape serial number and the name of the manufacturer that were obtained by decoding the respective medium identification pattern.

FIG. 6 is a flow chart of the operation of the tape drive apparatus 416 of FIG. 4. In step 600 the tape cartridge is loaded into the tape drive apparatus. In response to step 600, the drive spindle of the tape drive apparatus is activated in order to transport the tape medium past the optical sensor. The sensor output is compared with the reference pattern in step 602.

When the sensor output matches the reference pattern the control goes to step 604, to read the medium identification pattern from the signal that is delivered by the optical sensor. In step 606 the signal portion carrying the medium identification pattern is decoded. In step 608 the decoded medium identification pattern is stored in the log of FIG. 5. As an alternative or in addition, a manufacturer specific function is enabled or disabled in step 610, depending on the medium identification information contained in the decoded medium identification pattern.

The invention claimed is:

1. A medium for use in a tape drive apparatus, the medium having:
   a magnetic segment for magnetically storing information,
   an identification segment, the identification segment carrying a medium identification pattern, and
   a segment identification pattern for detection of the identification segment.

2. The medium of claim 1, the medium having an end segment and the identification segment being located on the end segment.

3. The medium of claim 2, the end segment being a leader segment.

4. The medium of claim 2, the end segment being transparent, the medium identification pattern and the segment identification pattern each comprising at least one opaque portion.

5. The medium of claim 4, the at least one opaque portion of the medium identification pattern having the form of a stripe.

6. The medium of claim 5, the stripe of the medium identification pattern being representative of one bit of medium identification information.

7. The medium of claim 1, the medium identification pattern being indicative of a type of the medium.

8. The medium of claim 1, the medium identification pattern being indicative of a manufacturer of the medium.

9. The medium of claim 1, the medium identification pattern being indicative of a serial number of the medium.

10. The medium of claim 1, the medium identification pattern being indicative of a globally unique identifier of the medium.

11. The medium of claim 1, the medium identification pattern being indicative of a functionality of the tape drive apparatus to be enabled or disabled.

12. The medium of claim 1, the medium identification pattern being indicative of a physical property of the medium.

13. The medium of claim 1, the segment identification pattern being located between the medium identification pattern and the magnetic segment.

14. The medium of claim 1, the segment identification pattern carrying a synchronization word.

15. The medium of claim 1, the magnetic segment and an end segment of the medium being connected by a splicing tape, the splicing tape extending over an end portion of the end segment, the segment identification pattern being located outside the end portion on the end segment.

16. The medium of claim 15, the end portion being opaque.

17. A tape medium having a magnetic portion for magnetically storing information, an optically readable pattern, the pattern carrying at least two bits of information, and comprising:
   an identification segment, the identification segment comprising a medium identification pattern, and
   a segment identification pattern for detection of the identification segment, and wherein the optically readable pattern comprises opaque portions on a transparent portion of the tape medium.

18. The tape medium of claim 17, wherein the transparent portion of the tape medium comprises a tape leader portion.

19. The tape medium of claim 17, wherein the transparent portion of the tape medium comprises a tape trailer portion.

* * * * *